Sept. 9, 1947. B. STECHBART 2,427,164
SLIDE PROJECTOR APPARATUS
Filed Feb. 5, 1945 6 Sheets-Sheet 1

INVENTOR
BRUNO STECHBART
BY *Robert F. Miehle, Jr.*
ATT'Y.

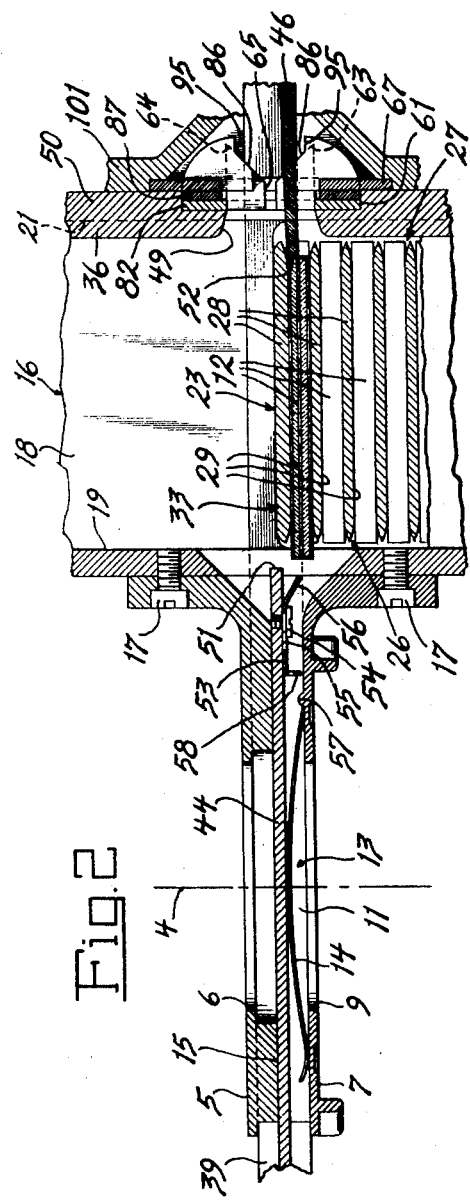
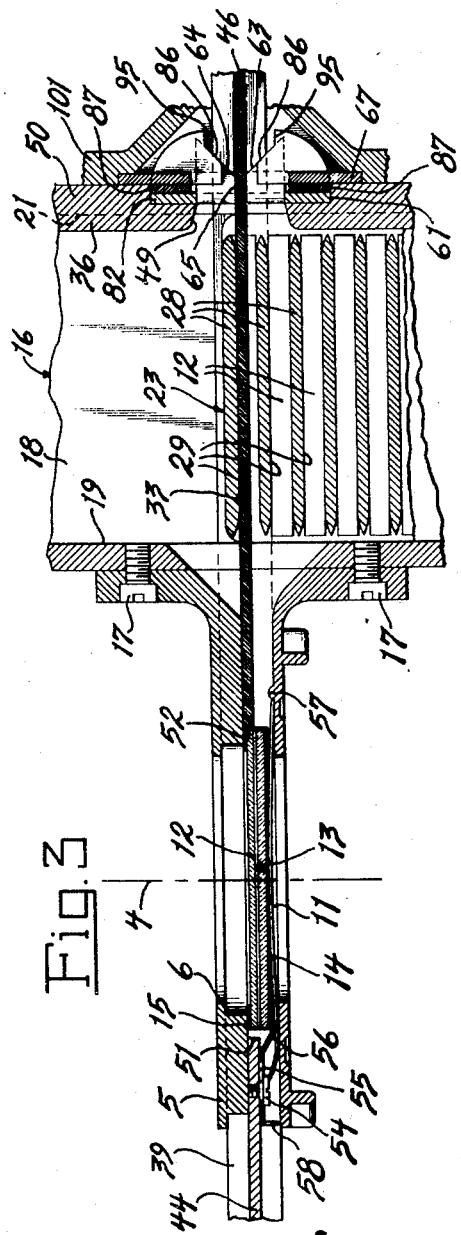

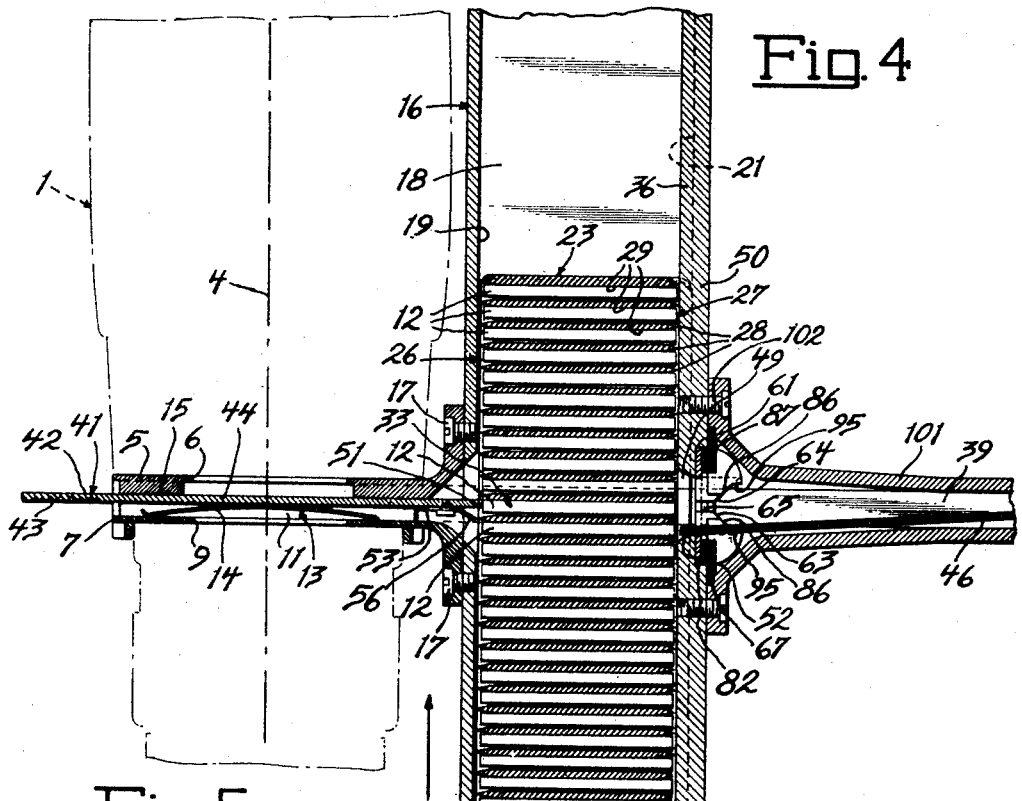
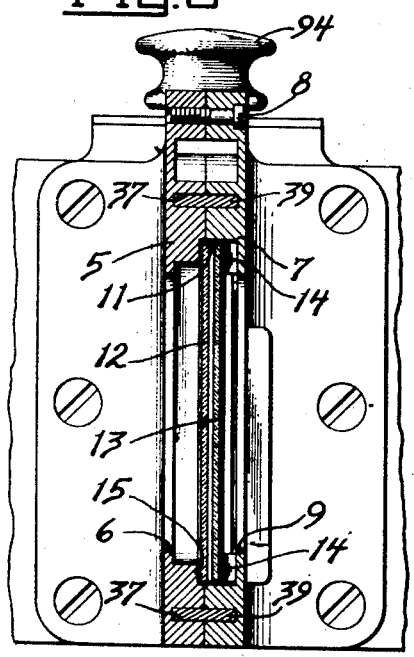
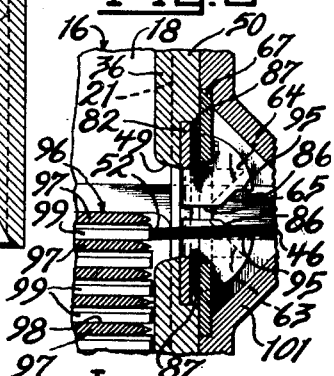

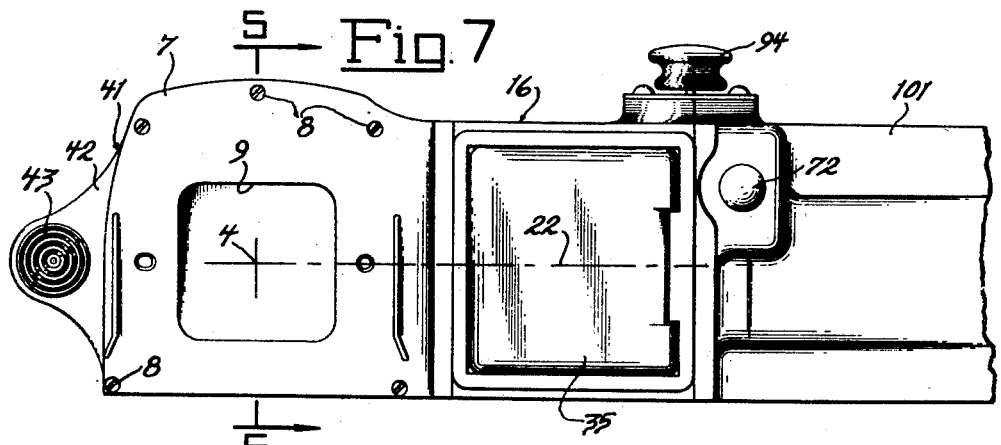
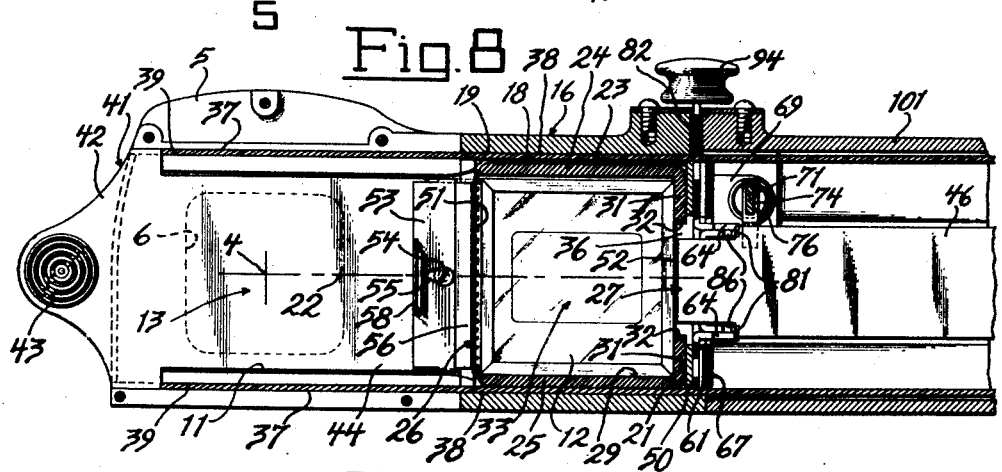
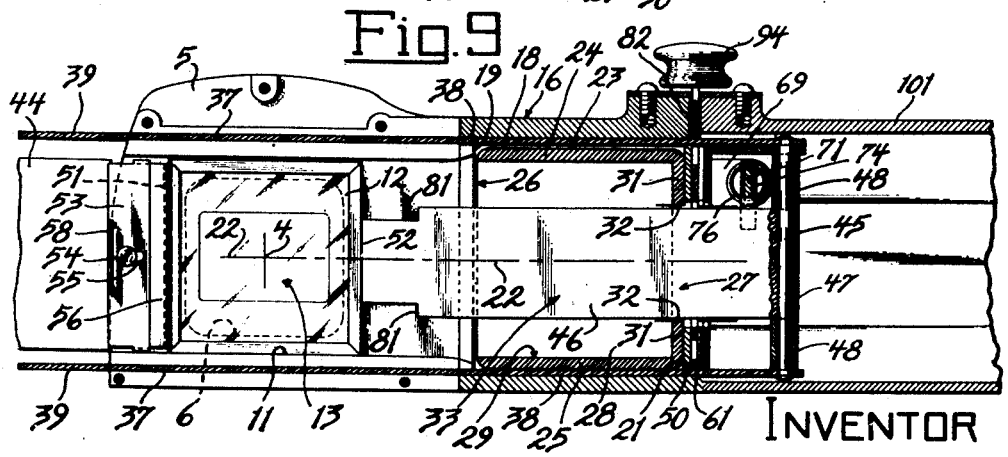

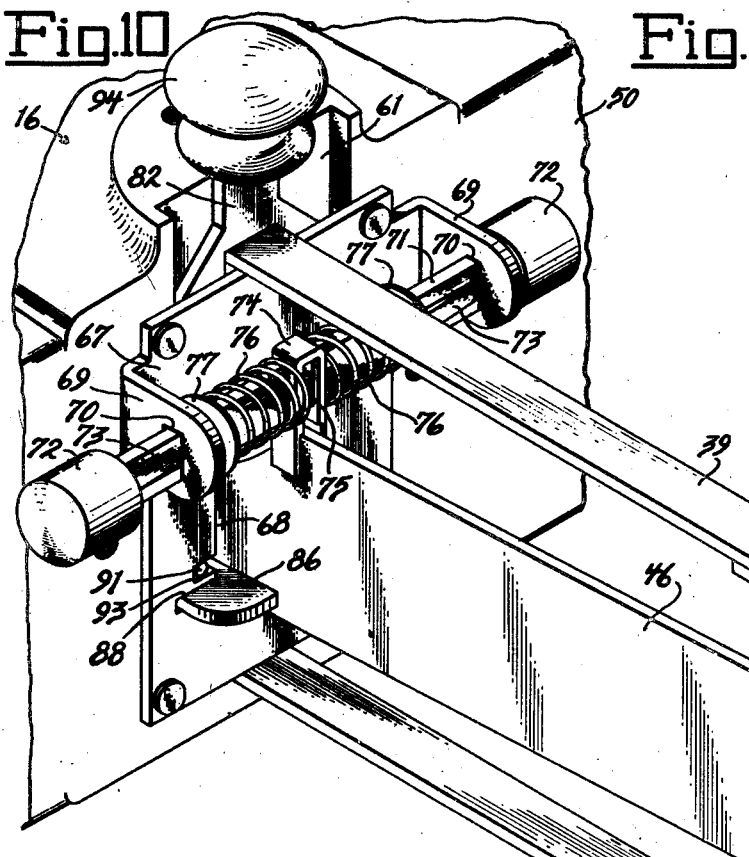
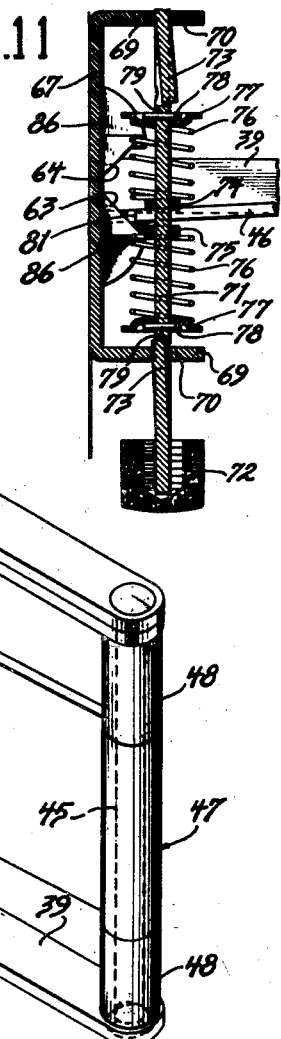
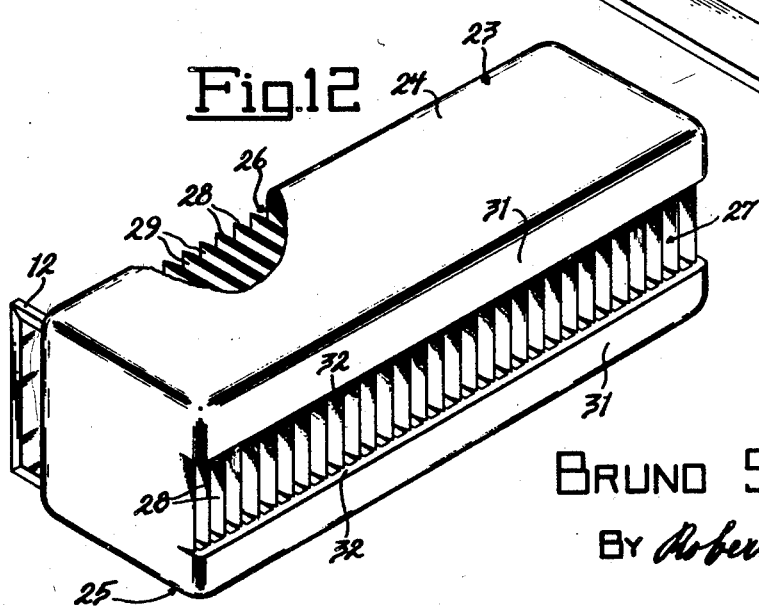

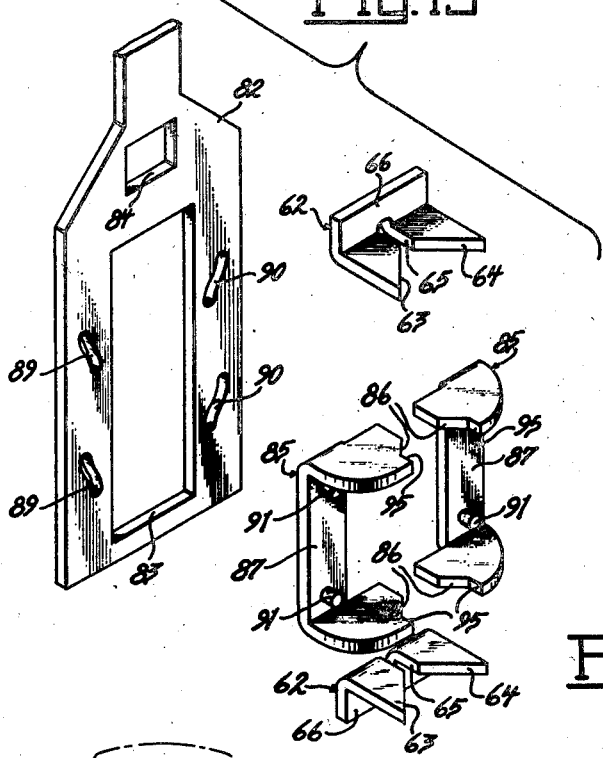
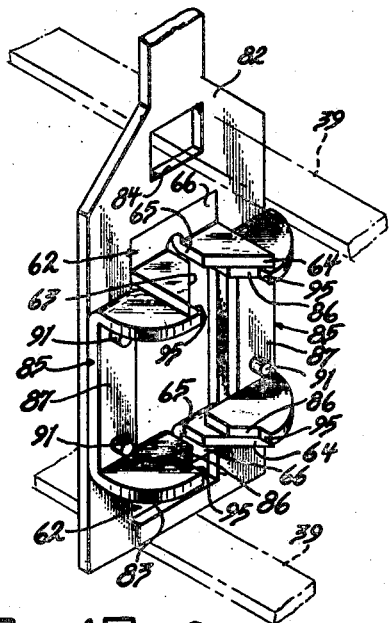
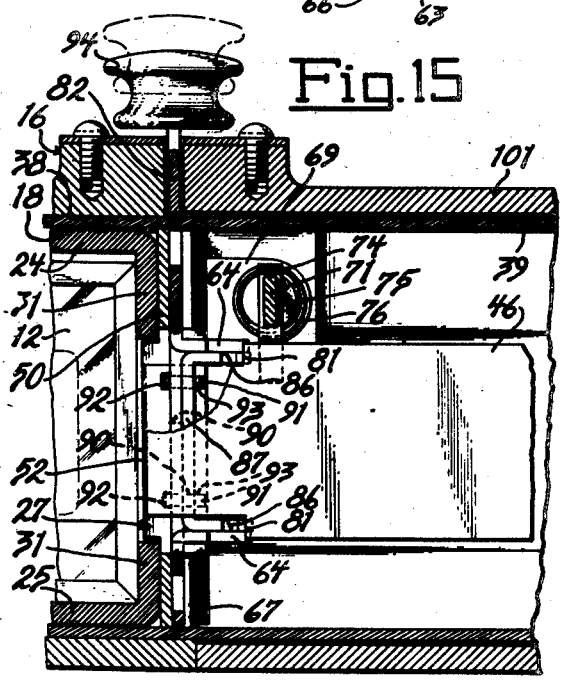
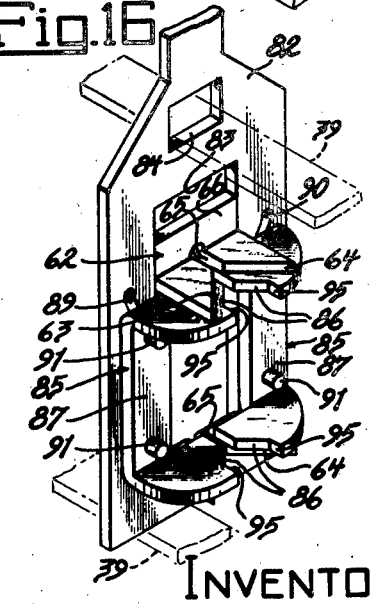

Patented Sept. 9, 1947

2,427,164

UNITED STATES PATENT OFFICE 2,427,164

SLIDE PROJECTOR APPARATUS

Bruno Stechbart, Park Ridge, Ill., assignor to The Bell & Howell Company, Chicago, Ill., a corporation of Illinois Application February 5, 1945, Serial No. 576,298

16 Claims. (Cl. 88—28)

1

My invention relates to slide projectors such as are used to project pictures from slides carrying photographic picture bearing films and to that type of slide projector which is provided with an advanceable slide carrier adapted to carry slides in sequence thereon and from which slides are sequentially transferred to a projection station for the sequential projection of pictures therefrom and returned to the carrier.

Objects of the invention reside in the provision in a slide projector of the above type of novel, desirable and effective mechanism for intermittently advancing a slide carrier to sequentially bring slides carried in sequence thereon to a transfer station and transferring the slides from the transfer station to a projection station and returning the slides to the transfer station for the sequential projection of pictures from the slides, which is particularly adapted for manual actuation, which provides for reversal of the advancing movement of the carrier so that the slides may be exhibited in reverse order, and which provides for the interchangeable use of slide carriers having different slide sequence spacings for the accommodation of slides of different thicknesses.

The invention will be better understood by reference to the accompanying drawing in which—

Figures 2 and 2 are partial sectional views taken substantially on the line 2—2 of Figure 1 and showing the slide handling mechanism of the machine in different positions of its operating cycle;

Figure 4 is a partial sectional view similar to Figures 2 and 3 and showing the slide handling mechanism in a different position of its operating cycle than those in which it is shown in Figures 2 and 3;

Figure 5 is a partial sectional view taken substantially on the line 5—5 of Figure 7;

Figure 6 is a partial sectional view similar to Figures 2 and 3 and showing a slide carrier of a slide sequence spacing different from that of the slide carrier shown in Figures 2, 3 and 4 and showing the slide handling mechanism adjusted for advancing the slide carrier of Figure 6 as hereinafter explained;

Figure 7 is a partial front elevation of the slide handling mechanism;

Figures 8 and 9 are sectional views in elevation similar to Figure 7 of the slide handling mechanism and showing the same in different positions of its operating cycle;

2

Figure 1:
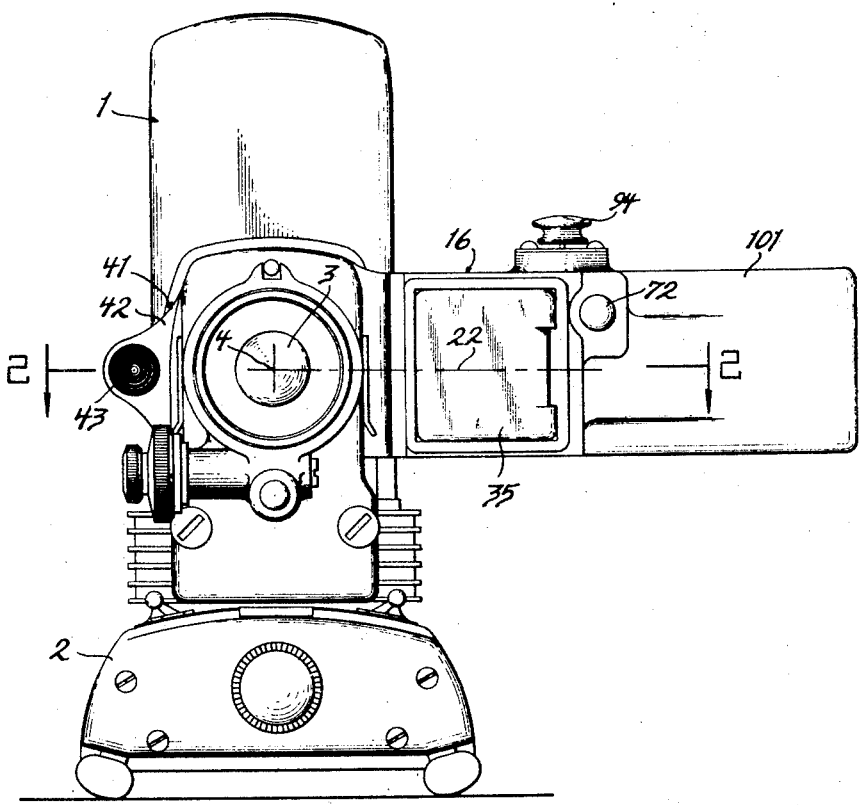
Figure 1 is a front elevation of a slide projecting machine embodying my invention.

Figure 10 is a perspective view of a portion of the slide handling mechanism with a closure part thereof removed;

Figure 11 is a partial sectional view in a horizontal plane of the portion of the slide handling mechanism which is operative to selectively reverse the direction of advancing movement of the slide carrier as hereinafter explained;

Figure 12 is a perspective view of a slide carrier of my apparatus with a portion broken away;

Figure 13 is an exploded perspective view of the cam parts of the slide carrier advancing mechanism of the machine;

Figure 14 is a perspective view of the cam parts of the slide carrier advancing mechanism which shows them in assembled relation;

Figure 15 is a sectional view in elevation similar to Figure 8 but showing more detail and having a part broken away for clarity; and Figure 16 is a perspective view similar to Figure 14 which shows the cam parts of the slide carrier advancing mechanism in a different relation than that in which they are shown in Figure 14.

Referring to the drawing, the projection portion of the projecting machine is designated at 1 and is supported on a suitable base 2 and embodies a usual rearwardly disposed illuminating means, not shown, and a forwardly disposed projection lens 3 arranged along a horizontal projection axis 4. See Figures 1 and 4. A vertical frame plate 5 is disposed across the projection axis intermediate the illuminating means and the projection lens and is provided with a rectangular light aperture 6 surrounding the projection axis, see Figures 2, 4 and 5, and a second vertical frame plate 7 is disposed across the projection axis immediately in front of the plate 5 and is secured rearwardly against the plate 5, as designated at 8, and is provided with a rectangular light aperture 9 surrounding the projection axis. See also Figure 7. The frame plates 5 and 7 are secured with and form a part of the projection portion 1 of the machine.

The contiguous faces of the frame plates 5 and 7 are channeled to provide a bearing slide 11 extending horizontally and transversely of the projection axis 4 with the projection axis disposed vertically intermediate the same. See Figures 2, 3 and 5. A rectangular picture bearing projection slide 12 is slidably engageable in the bearing slide 11, horizontally and transversely of the projection axis, for movement to and from a projection station 13 at the projection axis, the slide 12 being positioned facewise and longitudinally of the projection axis when at the projection station by vertically spaced and horizontally and transversely extending bow springs 14 within the bearing slide 11 and reacting on the plate 7 and engaging the upper and lower marginal portions of the slide 12 to yieldably urge the slide 12 rearwardly against the forwardly facing surface 15 of the bearing slide.

A slide carrier mounting, generally designated at 16, is secured as designated at 17 with the frame plates 5 and 7 and is disposed at one side of the projection portion 1 of the machine. See Figures 1 and 4. This slide carrier mounting is provided with a linear mounting bore 18 of rectangular cross section and extending longitudinally and disposed horizontally to one side of the projection axis 4 with two opposite sides 19 and 21 thereof disposed normal to and intermediately intersected by the horizontal axial plane 22 of the projection axis. See particularly Figures 8 and 9.

A linear slide carrier 23, see particularly Figures 8, 9 and 12, is of rectangular cross section and is provided with walls 24 and 25, respectively, at two opposite sides thereof and with openings 26 and 27, respectively, at the other two opposite sides thereof. The slide carrier is also provided with interior spacing members 28 extending transversely and spaced longitudinally thereof and connected and forming with the walls 24 and 25, guides 29 for carrying a plurality of the rectangular picture bearing slides 12 therein in facewise sequence longitudinally of the slide carrier and with the slides disposed correspondingly with the rectangular cross section of the slide carrier. The side opening 26 is transversely coextensive with the guides 29 so that the slides 12 are slidably insertable in the guides 29 and removable therefrom, and the side of the slide carrier having the opening 27 is provided with lineally extending transversely spaced wall portions 31 respectively adjacent the walls 24 and 25 and providing therebetween the opening 27 as a relatively narrow opening at this side and extending lineally of the slide carrier, these wall portions 31 forming stops engageable by the picture bearing slides 12 to limit movement thereof inwardly of the opening 26, and the opposing edges 32 of these wall portions providing a lineally extending channel.

The rectangular cross section of the mounting bore 18 of the slide carrier mounting corresponds with that of the slide carrier 23, so that the slide carrier is slidably mountable in the mounting bore 18 for longitudinal movement lineally of said mounting bore with the walls 24 and 25 parallel to the plane 22 and with the opening 26 facing toward the projection axis 4 for sequentially bringing picture bearing slides 12 respectively carried in the guides 29 of the slide carrier to a transfer station, designated at 33, and disposed intermediate the extent of the mounting bore 18 and transversely spaced from the projection station 13, for the transfer of a slide 12 in the slide carrier at the transfer station to the projection station and the return of the slide to the transfer station within the slide carrier as hereinafter explained.

The ends of the mounting bore 18 are open, as designated at 34 in Figure 4, so that a slide carrier 23 may be inserted in or removed from the mounting bore, thus providing for the interchangeable mounting of slide carriers in the mounting bore, and hinged covers 35, see Figures 1 and 7, normally close the ends of the mounting bore.

A lineally extending inwardly projecting ridge 36 is provided on the side 21 of the mounting bore 18, see particularly Figure 8, and is of a width to slidably engage in the channel formed by the opposing edges 32 of the wall portions 31 of a slide carrier 23 to insure the slide carrier being properly positioned in the mounting bore with the side of the slide carrier having the opening 26, through which the slides 12 are insertable in and removable from the slide carrier, facing and adjacent the projection axis 4 and consequently with the side of the slide carrier having the opening 27 facing away and remote from the projection axis.

A slide transfer device, reciprocable transversely of the advancing path of a slide carrier 23 in the mounting bore 18 in correspondence with the plane 22, is provided and is operative on a slide 12 at the transfer station 33 to transfer the slide from the transfer station to the projection station 13 for the projection of a picture from the slide and to return the slide to the transfer station, and will now be described.

The contiguous faces of the frame plates 5 and 7 are channeled above and below the bearing slide 11 to provide bearing slides 37 extending horizontally and transversely of the projection axis, and these bearing slides are continued across the carrier mounting 16 by bearing slides 38 in the carrier mounting above and below a slide carrier 23 in the mounting bore 18. See Figures 2, 5 and 8. Two frame bars 39 are slidably engaged for longitudinal movement respectively in the bearing slides 37 and the bearing slides 38 and are thus reciprocable horizontally and transversely of the advancing path of a slide carrier 23 in the mounting bore 18.

A vertical transversely disposed plate 41 has an end portion 42 thereof extending between and secured with corresponding ends of the frame bars 39 so that the plate is carried by the frame bars for reciprocation therewith transversely of the advancing path of the slide carrier 23. See Figures 2, 3, 8 and 9. The plate 41 is reciprocable in the region of the projection portion 1 of the machine, and the end portion 42 is provided with an extending portion 43 adapted to be grasped for manually reciprocating the slide transfer device. A portion 44 of the plate 41 is of lesser width than the end portion 42 of this plate and is thus vertically spaced from the frame bars 39, and projects from the end portion 42 transversely toward the mounting bore 18 and is reciprocable in the bearing slide 11 across the projection axis 4 and the light apertures 6 and 9 of the frame plates 5 and 7, the portion 44 being disposed in the plane of a slide 12 at the transfer and projection stations 33 and 13.

The ends of the frame bars 39, opposite those at which the plate 41 is secured, are disposed a considerable extent outwardly from the slide carrier mounting 16, see Figure 10, and are secured together by a vertical rod 45, and an elongated vertically and transversely disposed plate 46 has one end thereof pivotally mounted on this rod, as designated at 47, and extends therefrom transversely in the direction toward the carrier mounting 16, the plate 46 being thus reciprocable with the plate 41 and the frame bars 39 transversely of the advancing path of the slide carrier 23 and also reciprocable lineally of the advancing path of the slide carrier 23.

The plate 46 is relatively narrow in width and is spaced intermediately of the frame bars 39 by spacing bushings 48 on the rod 45, so that this plate may pass through the opening 27 of the slide carrier 23 and between the spacing members 28 when it is reciprocated transversely of the advancing path of the slide carrier with the plate 41 and frame bars 39, an opening 49, see Figure 4, being provided in the outer vertical wall 50 of the slide carrier mounting 16 for the passage of the plate 46 therethrough and having sufficient width lineally of the advancing path of the slide carrier to provide for reciprocation of the plate 46 lineally of this advancing path as hereinafter explained.

The plates 41 and 46 and the frame bars 39 carrying the same constitute a slide transfer device reciprocable transversely of the advancing path of the slide carrier 23, and the plates 41 and 46 constitute opposing slide engaging members of the slide transfer device and, being spaced lineally of the reciprocating path of the transfer device, are adapted to confine a slide 12 edgewise between the spacedly opposing vertical edges of these plates, respectively designated at 51 and 52. Thus, the slide transfer device is operative with a reciprocation thereof to transfer a slide 12 at the transfer station 33 within the slide carrier to the projection station 13 for the projection of a picture from the slide and to return the slide to the transfer station, the slide being guided by the guides 29 and the bearing slide 11.

Figures 4, 8 and 15 show the slide transfer device at the end of the reciprocating movement thereof from which it is moved to transfer a slide from the transfer station 33 to the projection station 13, it being observed that in this position of the slide transfer device the plate 46 is not alined with the transfer station 33 and that the inner portion of the plate 46 is opposed to a slide 12 which is spaced from the transfer station the amount of the slide sequence spacing of the slide carrier 23. As movement of the slide transfer device is initiated to transfer a slide to the projection station, i. e., to the left in these figures, the inner end of the plate 46 passes between the two spacing members 28 between which the slide opposed by the inner end of the plate 46 is disposed and the edge 52 of the plate 46 engages the opposing edge of this slide and initiates the propulsion thereof toward the projection station as will be seen in Figure 2. During this initial movement of the plate 46, it is also moved lineally of the advancing path of the slide carrier 23, by means hereinafter described, and by engagement of the plate 46 with one of the spacing members 28 between which it is passing, as also shown in Figure 2, the slide carrier is advanced to position the engaged slide at the transfer station 33 in which position the guide 29 in which the engaged slide is disposed is alined with the slide bearing 11. Completion of this movement of the slide transfer device, i. e., to the left in Figures 2, 3, 4, 8, 9 and 15, causes the plate 46, by engagement of the edge 52 of this plate with the opposing edge of the engaged slide, to propel the engaged slide 12 from the transfer station 33 to the projection station 13 as shown in Figures 3 and 9, for the projection of a picture from the engaged slide at the projection station, and movement of the slide transfer device in the opposite direction from the position shown in Figure 3, i. e., to the right in this figure, causes the plate 41 to propel the engaged slide back to the transfer station 33 by engagement of the edge 51 of the plate 41 with the opposing edge of this slide. During the final movement of the plate 46 in the last mentioned direction, i. e., to the right, and as the inner end of this plate passes out of engaging relation with the spacing members 28 between which it has passed, the plate 46 is moved lineally of the advancing path of the slide carrier 23 in the direction opposite that first mentioned and to its first mentioned position by means hereinafter described. The reciprocation of the plate 46 lineally of the advancing path of the slide carrier 23 with reciprocation thereof transversely of this advancing path serves to intermittently advance the slide carrier for sequentially bringing slides to the transfer station and consequently sequentially transferring the slides from the transfer station to the projection station and returning the slides to the transfer station, the result being the projection of pictures from the slides sequentially with sequential reciprocation of the slide transfer device.

The portion 44 of the plate 41, in passing across the light apertures 6 and 9 of the frame plates 5 and 7, serves as a light shutter for substantially cutting off the projection light except as it passes through a slide 12, and in order to prevent a line of projection light from passing between the edge 51 of the portion 44 and the opposing edge of a slide 12, a vertically extending light shield 53 is mounted on the portion 44 adjacent the edge 51 for horizontal movement relative to the portion 44 by means of a headed and shouldered screw 54 passing through a horizontal slot 55 through the shield and screwthreaded into the portion 44. See Figures 2, 3, 8 and 9. The shield 53 slides in the slide bearing 11 and is maintained in vertical position thereby and, as so mounted on the portion 44, is reciprocated therewith, but by reason of the slot 55 is movable to a limited extent relative to the portion 44 lineally of the movement thereof, so that its vertical light shielding edge portion 56 may extend beyond the edge 51 and thus prevent light from passing between the edge 51 and the opposing edge of the slide 12, as shown in Figures 3 and 9, or it may be positioned inwardly from the edge 51, as shown in Figures 2 and 8, so as not to interfere with a slide 12 in the slide carrier as the slide carrier is advanced as hereinafter described. An extrusion 57 on the frame plate 7 within the slide bearing 11 frictionally engages a lateral flange 58 on the light shield 53 to move the light shield relative to the portion 44 into its light shielding position with initial movement of the slide transfer device in the direction in which it transfers a slide to the projection station 13 and to move the light shield to its withdrawn position inwardly of the edge 51 with final movement of the slide transfer device in the direction in which it transfers a slide to the transfer station. Thus, the light shield 53 is in its light shielding position relative to the portion 44 as the edge 51 passes across the light apertures 6 and 9 of the frame plates 5 and 7 and is in its withdrawn position inwardly at the edge 51 when the edge 51 is adjacent the slide carrier 23 so as not to interfere with slides in the slide carrier as the slide carrier is advanced.

Advancing means is provided which is operative to intermittently advance the slide carrier 23 in timed relation with reciprocation of the slide transfer device to sequentially bring slide 12 to the transfer station 33, and will now be described.

The plate 46, which as above described comprises the slide engaging member of the slide transfer device which propels a slide 12 from the transfer station 33 to the projection station 13 and which passes between adjacent spacing members 28 with reciprocation of the slide transfer device, constitutes an advancing member and is reciprocable transversely of the advancing path of the slide carrier 23 into and out of engaging relation with the spacing members 28 respectively with its slide propelling and slide nonpropelling movements, and the spacing members 28 extend transversely of the narrow opening 27 at the inside of the channel formed by the opposing edges 32 of the wall portions 31 of the slide carrier and so constitute advancing formations on the slide carrier and spaced lineally of the advancing path thereof in correspondence with the slide sequence spacing of the carrier. As above described, the plate 46 is reciprocable lineally of the advancing path of the slide carrier as well as transversely thereof.

The outer vertical wall 50 of the slide carrier mounting 16 is provided with a relatively wide vertical channel 61 in its outer face, and the opening 49 of this wall through which the plate 46 passes is disposed intermediate the width of this channel. See particularly Figures 4, 10 and 15. Each of two duplicate cam members 62 comprises oppositely inclined cams 63 and 64 spacedly opposing each other and having a guide slot 65 therebetween and a base part 66 extending across and connecting the same and disposed normal thereto. These cam members have the base parts 66 thereof fixedly secured in a usual manner against the bottom surface of the channel 61 intermediately of the width thereof, and as so secured, these cam members 62 are vertically spaced and disposed respectively at the top and bottom of the opening 49 and are disposed in vertically centered relation therewith with the cams 63 and 64 spacedly opposing each other lineally of the advancing path of the slide carrier 23 and projecting outwardly from the channel 61 and with the base parts 66 extending vertically from the cams 63 and 64 away from each other so that the plate 46 may pass between these cams and through the guide slots 65 in its reciprocation transversely of the advancing movement of this plate.

A cover plate 67 is secured in a usual manner on the outer face of the outer vertical wall 50 and extends across the channel 61 between the frame bars 39 and is provided with an opening 68 through which the plate 46 passes. The plate 67 is provided at the upper portions of its sides with outwardly projecting arms 69 spaced longitudinally of the advancing path of the slide carrier 23 and provided with rectangular apertures 70. See particularly Figures 10 and 11. A bar 71 of rectangular cross section extends across between the arms 69 and is slidably mounted in the apertures 70 for longitudinal movement lineally of the advancing path of the slide carrier 23, and the projecting ends of the bar are provided with manipulating knobs 72 for manually positioning the bar at opposite ends of its longitudinal movement, spring arms 73 being struck from the bar for frictionally engaging the apertures 70 and releasably maintaining the bar 71 at either end of its longitudinal movement.

A U-shaped yoke 74 is slidably mounted on the bar 71, as designated at 75, and the downwardly projecting legs of the yoke slidably embrace the plate 46 therebetween, so that movement of the yoke 74 longitudinally of the bar 71 effects movement of the plate 46 in either direction lineally of the advancing path of the slide carrier 23. Coiled compression springs 76 encircle the bar 71 respectively on opposite sides of the yoke 74 and oppositely engage the yoke with their adjacent ends. The remote ends of the springs 76 oppositely engage against washers 77 which in turn engage against pins 78 engaged in transverse apertures 79 in the bar 71. As a result, the springs 76 are alternately operable on the plate 46 for actuating the same in opposite directions of its reciprocation lineally of the advancing path of the slide carrier 23 by selectively positioning the bar 71 at opposite ends of its longitudinal movement.

The inner end portion of the plate 46 is of lesser width than the remainder thereof to provide vertically spaced shoulders 81 spaced some distance inwardly from the slide engaging edge 52 and facing in the direction of slide propelling movement of the plate 46 and engageable alternately with the cams 63 and 64, depending upon which direction the plate 46 is actuated by the selected spring 76.

When the plate 46 is at the end of its slide non-propelling movement transversely of the advancing path of the slide carrier 23 as shown in Figure 4, it is out of engaging relation with the spacing members 28, and assuming that the bar 71 is positioned as shown in Figure 10, the selected spring 76 is operative on the plate 46 through the yoke 74 to actuate the plate to the end of its movement lineally of the advancing path of the slide carrier 23 as shown in Figure 4. Initial movement of the plate 46 in its slide propelling direction from the position shown in Figure 4, i. e., to the left in this figure, causes the plate to move between adjacent spacing members 28 of the slide carrier and thus assume engaging relation with the spacing members as shown in Figure 2, the edge 52 of the plate engaging the opposing edge of a slide 12 and initially propelling the same. As this initial movement of the plate 46 occurs, the cams 63, engaging the shoulders 81 of the plate, actuate the plate, in opposition to the selected spring 76, lineally of the advancing path of the slide carrier in the direction shown by the arrow in Figure 4 to a position in which the plate 46 alines with the plate 42 in which position the plate 46 engages in the guide slots 65 which maintain the plate 46 in this position throughout the major portion of the reciprocation of the plate 46 transversely of the advancing path of the slide carrier. As a result, the slide carrier is advanced the extent of the spacing of the spacing members 28 to bring the engaged slide to the transfer station 33 for transfer of this slide to the projection station 13 and return to the transfer station as hereinbefore explained. As the plate 46 nears the end of its slide non-propelling movement during the return of the engaged slide to the transfer station, the plate 46 disengages from the guide slots 65 and moves out of engaging relation with the spacing members 28, and the selected spring 76, maintaining the shoulders 81 against the cams 63, actuates the plate 46 lineally of the advancing path of the slide carrier in the direction opposite that shown by the arrow in Figure 4 and back to that position first described and shown in this figure, preparatory to another intermittent advance of the slide carrier and the transfer of a succeeding slide from the transfer station to the projection station and the return thereof to the transfer station. Accordingly, the plate 46 is reciprocated lineally of the advancing path of the slide carrier 23 in timed relation with and as an incident of its reciprocation transversely of the advancing path of the slide carrier to intermittently advance the slide carrier to sequentially bring the slides on the slide carrier to the transfer station for sequentially projecting pictures from the slides.

Assuming that the bar 71 is positioned in the position opposite that shown in Figure 10, the other spring 76 is operative on the plate 46 to actuate the plate to the end of its movement lineally of the advancing path of the slide carrier 23 opposite that shown in Figure 4 with the result that the shoulders 81 of the plate are thereby engaged with the cams 64 and control of reciprocation of the plate lineally of the advancing path of the slide carrier is transferred from the cams 63 to the cams 64. The cams 64 and their spring 76 function to reciprocate the plate 46 lineally of the advancing path of the slide carrier in the same manner as do the cams 63 and their spring 76 above described, so that a detailed description of the operation of the cams 64 and their spring is unnecessary. However, the cams 63 and 64 are alternately operable for actuating the plate 46 respectively in opposite directions of its reciprocation lineally of the advancing path of the slide carrier 23 responsive to movement of this plate in its slide propelling direction transversely of the advancing path of the slide carrier, with the result that the cams 63 and 64 are alternately operable on the plate 46 for effecting reciprocation thereof lineally of the advancing path of the slide carrier in respectively opposite timed relation with reciprocation of the plate transversely of the advancing path of the slide carrier. Accordingly, the direction of intermittent advance of the slide carrier may be reversed by positioning the bar 71 at one or the other end of its movement to select the desired direction of advance of the slide carrier.

A plate 82 is mounted for vertical sliding movement in the channel 61, this plate being provided with a vertically elongated opening 83 embracing the base parts 66 of the cam members 62 and through which the plate 46 passes, and being further provided with an opening 84 through which the upper frame bar 39 passes. See particularly Figures 10 and 13 to 16 inclusive.

Each of two duplicate cam members 85 comprises spaced correspondingly disposed identical cams 86 and a base part 87 extending between and connecting the cams and disposed normal thereto, the cams 86 of the two cam members being also identical. These cam members have the base parts 87 thereof mounted for sliding movement within the channel 61 between the plates 67 and 82 and extending vertically on opposite sides of the openings 68 and 83 with the cams 86 of each cam member vertically spaced and respectively disposed adjacent the tops and bottoms of these openings and projecting outwardly from the channel 61 through horizontal slots 88, shown in Figure 10, in the plate 67 and extending from the opening 68 of this plate. As so mounted, the cam members 85 are disposed in reversed relation and so that the cams 86 respectively of these cam members are oppositely inclined and spacedly oppose each other lineally of the advancing path of the slide carrier 23 and are vertically disposed for engaging relation with the shoulders 81 of the plate 46.

The plate 82 is provided with two pairs of vertically spaced cam slots 89 and 90 respectively disposed at opposite sides of the opening 83, see particularly Figure 13, and these pairs of cam slots are oppositely inclined vertically. Vertically spaced pairs of cam studs 91 extend through and are secured with the base parts 87 of the cam members 85, and these cam studs extend respectively through and slidably engage the cam slots 89 and 90 and the inner ends of these cam studs slidably engage in horizontal slots 92 in the bottom of the channel 61 of the wall 50 and the outer ends of these cam studs slidably engage in horizontal slots 93 in the plate 67. See Figures 10 and 15.

The cam members 85 are thus fixed vertically and are movable horizontally and lineally of the advancing path of the slide carrier 23, so that vertical adjustment of the plate 82 effects, by engagement of the cam studs 91 in the cam slots 89 and 90, simultaneous adjustment of the cam members 85 toward and away from each other lineally of the advancing path of the slide carrier 23, the cams 86 of the two cam members 85 being at all times equidistant from the central plane of the guide slots 65 of the cam members 62 and disposed respectively on opposite sides thereof. See particularly Figures 14 and 16. The upper end of the plate 82 is provided with a manipulating knob 94 facilitating vertical adjustment thereof.

The relations of the cams 63 and 64 with the cams 86 in the opposite positions of displacement of the cams 86 lineally of the advancing path of the slide carrier 23 are such that when the cams 86 are in their remotely separated relation with the plate 82 in its lower position, as shown in Figures 4 and 14, the lift portions of the cams 86 do not project beyond those of the cams 63 and 64, so that the cams 86 are inoperative while the cams 63 and 64 are alternately operative on the plate 46 by alternate engagement thereof with the shoulders 81 and in cooperation with the springs 76 respectively to reciprocate the plate 46 lineally of the advancing path of the slide carrier 23 with reciprocation of the plate 46 transversely of said advancing path to intermittently advance the slide carrier as hereinbefore described, and that when the cams 86 are in their adjacently separated relation with the plate 82 in its upper position, as shown in Figures 6 and 16, the lift portions of the cams 86 project beyond those of the cams 63 and 64 so that the cams 63 and 64 are inoperative, while the cams 86 respectively of the cam members 85 are alternately operatively on the plate 46 by alternate engagement thereof with the shoulders 81 and in cooperation with the springs 76 respectively to reciprocate the plate 46 lineally of the advancing path of a slide carrier in the mounting 16 with reciprocation of the plate 46 transversely of said advancing path to intermittently advance the slide carrier in the same manner as hereinbefore described with respect to the cams 63 and 64.

Thus, the cams 86 respectively of the cam members 85 are alternately operable for actuating the plate 46 respectively in opposite directions of its reciprocation lineally of the advancing path of a slide carrier in the mounting 16 responsive to movement of this plate in its slide propelling direction transversely of the advancing path of the slide carrier with the result that the cams 86 respectively of the cam members 85 are alternately operable on the plate 46 for effecting reciprocation thereof lineally of the advancing path of a slide carrier in the mounting 16 in respectively opposite timed relation with reciprocation of the plate transversely of the advancing path of the slide carrier. Accordingly, the direction of intermittent advance of the slide carrier in the mounting 16 as alternately effected by the cams 86 respectively of the cam members 85 may be reversed by positioning the bar 71 at one or the other end of its movement to select the desired direction of advance of a slide carrier in the mounting in the same manner as when the cams 63 and 64 are alternately operative on the plate 46.

The cams 86 are provided with dwell portions 95 at their outer extremities which limit reciprocation of the plate 46 lineally of the advancing movement of a slide carrier in the mounting 16 in both positions of displacement of these cams lineally of said advancing path, and the cams 86 are of lesser lift than the cams 63 and 64 so that the extent of reciprocation of the plate 46 lineally of the advancing path of a slide carrier in the mounting 16 is less when the cams 86 respectively of the cam members 85 are alternately operative thereon than when the cam members 63 and 64 are alternately operative thereon.

The extent of reciprocation of the plate 46 lineally of the advancing path of a slide carrier in the mounting 16 as effected by the cams 63 and 64 corresponds with the spacing of the spacing members 28 of the slide carrier 23 which constitute the advancing formations of this slide carrier with which the plate 46 cooperates in intermittently advancing this slide carrier, this spacing being, of course, the same as the sequence spacing of the slides 12 in this slide carrier. The picture bearing slides 12 are of the glass enclosure type and are relatively thick, so that the resulting slide sequence spacing of these slides in the slide carrier 23 and the corresponding spacing of the spacing members 28 are correspondingly relatively great.

In order to accommodate picture bearing slides of the paper enclosure type which are thinner than those of the glass enclosure type, another slide carrier 96 is interchangeable with the slide carrier 23 in the mounting 16. See Figure 6. The slide carrier 96 is identical with the slide carrier 23 except that the spacing members 97 of the slide carrier 96, which correspond with the spacing members 28 of the slide carrier 23, have a lesser spacing lineally of the slide carrier 97 to provide guides 98 which are of lesser width than the guides 29 of the slide carrier 23 so as to accommodate therein rectangular picture bearing slides 99 of the thinner paper enclosure type with the slides 99 in facewise sequence longitudinally of the slide carrier 96 and with the slides 99 disposed correspondingly with the rectangular cross section of this slide carrier. Consequently, the slide sequence spacing of the slide carrier 96 and the corresponding spacing of the spacing members 97 thereof is less than the slide sequence spacing and corresponding spacing of the spacing members 28 of the slide carrier 23.

The extent of reciprocation of the plate 46 lineally of the advancing path of a slide carrier in the mounting 16 as effected by the cams 86 corresponds with the spacing of the spacing members 97 of the slide carrier 96 which constitute the advancing formations on this slide carrier and spaced lineally of the advancing path thereof in correspondence with the slide sequence spacing of this carrier and with which the plate 46 cooperates in intermittently advancing this slide carrier, so that when the cams 86 are alternately operative on the plate 46, the slide carrier 96 is intermittently advanced to bring the slides 99 therein to the transfer station 33 for transfer in the same manner as when the cams 63 and 64 are alternately operative on the plate 46, the slide carrier 12 is intermittently advanced to bring the slides 12 therein to the transfer station 33 for transfer, the slide transfer device functioning in the same manner as hereinbefore described in both cases.

Thus, the mechanism is operative to intermittently advance either of the interchangeable slide carriers 23 and 96 having different slide sequence and advancing formation spacings respectively for sequentially bringing slides in either slide carrier to the transfer station 33 pursuant to sequentially projecting pictures from the slides, the plate 82 being disposed in its lower position when the slide carrier 23 is used and this plate being in its upper position when the slide carrier 96 is used. Further, the direction of advance of either of these slide carriers may be reversed by moving the bar 71 to one or the other end of its movement.

A closure member 101 is secured, as designated at 102 in Figure 4, on the outer wall 50 of the carrier mounting 16 and encloses the portion of the mechanism which projects outwardly from this wall, the bar 71 projecting through the closure member so that the knobs 72 are disposed exterior of the closure member for manipulation.

While I have thus described my invention, I do not wish to be limited to the precise details described, as changes may be readily made without departing from the spirit of my invention, but having thus described my invention, I claim as new and desire to secure by Letters Patent the following:

1. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring slides to said transfer station and comprising advancing formations on said carrier and spaced lineally of said advancing path, an advancing member carried with said transfer device for reciprocation therewith transversely of said advancing path into and out of engaging relation with said advancing formations and also reciprocable lineally of said advancing path, and actuating means comprising a part normally stationary with respect to said first mentioned reciprocation of said advancing member and operative to effect said second mentioned reciprocation of said advancing member with said first mentioned reciprocation thereof.

2. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring slides to said transfer station and comprising advancing formations on said carrier and spaced lineally of said advancing path, an advancing member carried with said transfer device for reciprocation therewith transversely of said advancing path into and out of engaging relation with said advancing formations and also reciprocable lineally of said advancing path, and a cam device comprising a cam normally stationary with respect to said first mentioned reciprocation of said advancing member and operative to effect said second mentioned reciprocation of said advancing member with said first mentioned reciprocation thereof.

3. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocatory path of said transfer device and adapted to confine a slide edgewise therebetween, and advancing means operative to intermittently advance said carrier to sequentially bring slides to said transfer station and comprising advancing formations on said carrier and spaced lineally of said advancing path, an advancing member comprising one of said slide engaging members and reciprocable transversely of said advancing path into and out of engaging relation with said advancing formations and also reciprocable lineally of said advancing path, and actuating means comprising a part normally stationary with respect to said first mentioned reciprocation of said advancing member and operative to effect said second mentioned reciprocation of said advancing member with said first mentioned reciprocation thereof.

4. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocatory path of said transfer device and adapted to confine a slide edgewise therebetween, and advancing means operative to intermittently advance said carrier to sequentially bring slides to said transfer station and comprising advancing formations on said carrier and spaced lineally of said advancing path, an advancing member comprising the one of said slide engaging members which propels a slide from said transfer station and reciprocable transversely of said advancing path into and out of engaging relation with said advancing formations respectively with its slide propelling and slide non-propelling movements and also reciprocable lineally of said advancing path, and a cam device comprising a normally stationary cam part operative to actuate said advancing member in one direction of its second mentioned reciprocation with movement of said advancing member in its slide propelling direction and spring means operative to actuate said advancing member in the other direction of its second mentioned reciprocation.

5. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring slides to said transfer station and comprising advancing formations on said carrier and spaced lineally of said advancing path, an advancing member connected with said transfer device for reciprocation therewith transversely of said advancing path into and out of engaging relation with said advancing formations and also reciprocable lineally of said advancing path, and actuating means operative with said first mentioned reciproaction of said advancing member for effecting said second mentioned reciprocation of said advancing member including carrier advance reversing means operative to selectively oppositely time said first and second mentioned reciprocations of said advancing member.

6. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring slides to said transfer station and comprising advancing formations on said carrier and spaced lineally of said advancing path, an advancing member connected with said transfer device for reciprocation therewith transversely of said advancing path into and out of engaging relation with said advancing formations and also reciprocable lineally of said advancing path, two cam devices alternately operative on said advancing member with said first mentioned reciprocation of said advancing member for effecting said second mentioned reciprocation thereof in respectively opposite timed relation with said first mentioned reciprocation thereof, and selecting means operative to alternately operatively relate said cam devices with said advancing member.

7. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring slides to said transfer station and comprising advancing formations on said carrier and spaced lineally of said advancing path, an advancing member connected with said transfer device for reciprocation therewith transversely of said advancing path into and out of engaging relation with said advancing formations and also reciprocable lineally of said advancing path, two cam devices comprising normally stationary cam parts spacedly opposing each other lineally of said advancing path and alternately operative for actuating of said advancing member respectively in opposite directions of said second mentioned reciprocation thereof with movement of said advancing member in one direction of its first mentioned reciprocation, spring means alternately operative on said advancing member for actuating the same in opposite directions of its second mentioned reciprocation, and selecting means operative to render said spring means operative to alternately actuate said advancing member in said opposite directions.

8. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocatory path of said transfer device and adapted to confine a slide edgewise therebetween, and advancing means operative to intermittently advance said carrier to sequentially bring slides to said transfer station and comprising advancing formations on said carrier and spaced lineally of said advancing path, an advancing member comprising one of said slide engaging members and reciprocable transversely of said advancing path into and out of engaging relation with said advancing formations and also reciprocable lineally of said advancing path, and actuating means operative with said first mentioned reciprocation of said advancing member for effecting said second mentioned reciprocation of said advancing member including carrier advance reversing means operative to selectively oppositely time said first and second mentioned reciprocations of said advancing member.

9. In a slide projector, the combination with an advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocatory path of said transfer device and adapted to confine a slide edgewise therebetween, and advancing means operative to intermittently advance said carrier to sequentially bring slides to said transfer station and comprising advancing formations on said carrier and spaced lineally of said advancing path, an advancing member comprising the one of said slide engaging members which propels a slide from said transfer station and reciprocable transversely of said advancing path into and out of engaging relation with said advancing formations respectively with its slide propelling and slide non-propelling movements and also reciprocable lineally of said advancing path, two normally stationary cams spacedly opposing each other lineally of said advancing path and alternately operative for actuating said advancing member respectively in opposite directions of said second mentioned reciprocation thereof with movement of said advancing member in its said slide propelling direction, spring means alternately operative on said advancing member for actuating the same in opposite directions of its second mentioned reciprocation, and selecting means operative to render said spring means operative to alternately actuate said advancing member in said opposite directions.

10. In a slide projector, the combination with a linear slide carrier provided with slide spacing members extending transversely and spaced longitudinally thereof for carrying slides in spaced facewise sequence thereon, of a linear carrier mounting extending longitudinally and to one side of the projection axis of the projector and on which said carrier is mountable for longitudinal movement lineally of said mounting for sequentially bringing said slides to a transfer station, a slide transfer device reciprocable transversely of said carrier movement and operative with a reciprocation thereof to transfer a slide from said transfer station to a projection station at said projection axis and to return the same to said transfer station and comprising opposing slide engaging members spaced lineally of the reciprocatory path of said transfer device and adapted to confine a slide edgewise therebetween and of which the slide engaging member which propels a slide to said projection station is adapted to pass between adjacent of said spacing members with reciprocation of said transfer device, and advancing means operative to intermittently advance said carrier to sequentially bring slides to said transfer station and comprising advancing formations on said carrier and comprising said spacing members, an advancing member comprising said slide engaging member and reciprocable transversely of said carrier movement into and out of engaging relation with said advancing formations respectively with its slide propelling and slide non-propelling movements and also reciprocable lineally of said carrier movement, and actuating means operative with said first mentioned reciprocation of said advancing member for effecting said second mentioned reciprocation of said advancing member.

11. In a slide projector, the combination with a linear slide carrier of rectangular cross section provided with walls respectively at two opposite sides thereof and with openings at the other two opposite sides thereof and with interior slide spacing members extending transversely and spaced longitudinally thereof and forming with said walls guides for carrying rectangular slides in spaced facewise sequence therein and with the slides disposed correspondingly with said rectangular cross section, of a carrier mounting provided with a linear mounting bore of rectangular cross section corresponding with that of said carrier and extending longitudinally and disposed to one side of the projection axis of the projector with two opposite sides thereof disposed normal to and intermediately intersected by an axial plane of said projection axis and in which said carrier is mountable with said walls parallel to said plane for longitudinal movement lineally of said mounting bore for sequentially bringing said slides to a transfer station, a slide transfer device reciprocable transversely of said carrier movement in correspondence with said plane and operative with a reciprocation thereof to transfer a slide from said transfer station to a projection station at said projection axis and to return the same to said transfer station and comprising opposing slide engaging members spaced lineally of the reciprocatory path of said transfer device and adapted to confine a slide edgewise therebetween and of which the slide engaging member which propels a slide to said projection station is adapted to pass between adjacent of said spacing members with reciprocation of said transfer device, and advancing means operative to intermittently advance said carrier to sequentially bring slides to said transfer station and comprising advancing formations on said carrier and comprising said spacing members, an advancing member comprising said slide engaging member and reciprocable transversely of said carrier movement into and out of engaging relation with said advancing formations respectively with its slide propelling and slide non-propelling movements and also reciprocable lineally of said carrier movement, and actuating means operative with said first mentioned reciprocation of said advancing member for effecting said second mentioned reciprocation of said advancing member.

12. In a slide projector, the combination of claim 11, and further characterized in that one of said two opposite sides of said slide carrier is provided with lineally extending transversely spaced wall portions respectively adjacent said first mentioned walls and providing therebetween a relatively narrow lineally extending opening at this side through which said slide engaging member is adapted to pass and the opposing edges of said wall portions providing a lineally extending channel, and the projection axis remote side of said two opposite sides of said mounting bore being provided with a lineally extending inwardly projecting ridge disposable in said channel.

13. In a slide projector, the combination with an interchangeably mounted advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocating path of said transfer device and adapted to confine a slide edgewise therebetween, and advancing means operative to intermittently advance said carrier to sequentially bringe the slides carried thereon to said transfer station and comprising advancing formations on said carrier and spaced lineally of the advancing path thereof in correspondence with the slide sequence spacing of the same, an advancing member comprising the one of said slide engaging members which propels a slide from said transfer station and reciprocable transversely of said advancing path into and out of engaging relation with said advancing formations respectively with its slide propelling and non-propelling movements and also reciprocable lineally of said advancing path, two normally stationary cams of different lifts alternately operative with movement of said advancing member in its slide propelling direction for moving said advancing member in the same direction of its second mentioned reciprocation respectively to different extents corresponding respectively with the advance formation spacing of said carrier and with the different slide sequence and advance formation spacing of another slide carrier interchangeable with said first mentioned carrier, spring means operable on said advancing member to actuate the same in the opposite direction of its second mentioned reciprocation, and selecting means operative to relatively displace said cams to render them alternately operative on said advancing member.

14. In a slide projector, the combination with an interchangeably mounted advanceable slide carrier adapted to carry slides in the facewise sequence thereon for sequentially bringing said slides to a transfer station, of a slide transfer device reciprocable transversely of the advancing path of said carrier and operative on a slide at said transfer station, advancing means operative to intermittently advance said carrier to sequentially bring the slides carried thereon to said transfer station and comprising advancing formations on said carrier and spaced lineally of the advancing path thereof in correspondence with the slide sequence spacing of the same, an advancing member connected with said transfer device for reciprocation therewith transversely of said advancing path into and out of engaging relation with said advancing formations and also reciprocable lineally of said advancing path, and actuating means operative with said first mentioned reciprocation of said advancing member for effecting said second mentioned reciprocation of said advancing member including carrier advance reversing means operative to selectively oppositely time said first and second mentioned reciprocations of said advancing member and advance movement altering means operative to selectively alter the extent of said second mentioned reciprocation of said advancing member to alternately correspond the same with the advance formation spacing of said carrier and with the different slide sequence and advance formation spacing of another slide carrier interchangeable with said first mentioned carrier.

15. In a slide projector, the combination with an interchangeably mounted advanceable slide carrier adapted to carry slides in facewise sequence thereon for sequentially bringing said slides to a transfer station, of a slide transfer device reciprocable transversely of the advancing path of said carrier and operative on a slide at said transfer station, and advancing means operative to intermittently advance said carrier to sequentially bring the slides carried thereon to said transfer station and comprising advancing formations on said carrier and spaced lineally of the advancing path thereof in correspondence with the slide sequence spacing of the same, an advancing member connected with said transfer device for reciprocation therewith transversely of said advancing path into and out of engaging relation with said advancing formations and also reciprocable lineally of said advancing path, four cam devices selectively operative on said advancing member with said first mentioned reciprocation thereof for effecting said second mentioned reciprocation thereof, the cam devices of each pair thereof being oppositely inclined for effecting said second mentioned reciprocation in respectively opposite timed relation with said first mentioned reciprocation and said pairs of cam devices being of different lifts to effect said second mentioned reciprocation respectively to different extents corresponding respectively with the advance formation spacing of said carrier and with the different slide sequence and advance formation spacing of another slide carrier interchangeable with said first mentioned carrier, and selecting means operative to selectively render said cam devices operative on said advancing member.

16. In a slide projector, the combination with an interchangeably mounted advanceable slide carrier adapted to carry slides in facewise sequence thereon for sequentially bringing said slides to a transfer station, of a slide transfer device reciprocable transversely of the advancing path of said carrier and operative on a slide at said transfer station and comprising opposing slide engaging members spaced lineally of the reciprocating path of said slide transfer device and adapted to confine a slide edgewise therebetween, and advancing means operative to intermittently advance said carrier to sequentially bring the slides carried thereon to said transfer station and comprising advancing formations on said carrier and spaced lineally of the advancing path thereof in correspondence with the slide sequence spacing of the same, an advancing member comprising one of said slide engaging members and reciprocable transversely of said advancing path into and out of engaging relation with said advancing formations and also reciprocable lineally of said advancing path, four normally stationary cams the cams of each pair of which are spacedly opposed to each other lineally of said second mentioned reciprocation of said advancing member and are oppositely inclined for actuating said advancing member respectively in opposite directions of its second mentioned reciprocation with movement of said advancing member in one direction of its first mentioned reciprocation and said pairs of cams being of different lifts respectively for effecting movement of said advancing member in its second mentioned reciprocation respectively to different extents corresponding respectively with the advance formation spacing of said carrier and with the different slide sequence and advance formation spacing of another slide carrier interchangeable with said first mentioned carrier, spring means alternately operative on said advancing member for actuating the same in opposite directions of its second mentioned reciprocation, selecting means operative to render said spring means operative to alternately actuate said advancing member in said opposite directions, the cams of the pair having the lesser lift being oppositely displaceable lineally of said second mentioned reciprocation of said advancing member and relative to the other pair of said cams into remote and adjacent relative positions for alternately operatively relating said pairs of cams with said advancing member, and a second selecting means operative to alternately position said cams of the pair having the lesser lift in said remote and adjacent relative positions.

BRUNO STECHBART.

REFERENCES CITED

The following references are of record in the file of this patent:

UNITED STATES PATENTS

| Number | Name | Date |
|---|---|---|
| 594,819 | Allen | Nov. 30, 1897 |
| 1,402,791 | Petherick | Jan. 10, 1922 |
| 998,305 | Roebuck | July 18, 1911 |
| 1,365,752 | Vischer | Jan. 18, 1921 |
| 695,548 | Fredrick | Mar. 18, 1902 |
| 2,370,004 | Brose | Feb. 20, 1945 |